United States Patent [19]
Ziemek

[11] 3,728,782
[45] Apr. 24, 1973

[54] PROCESS FOR THE PRODUCTION OF STRAIGHT-BEAD WELDED PIPE

[75] Inventor: Gerhard Ziemek, Hanover, Germany

[73] Assignee: Kabel-und Metallwerke Gutehoffnungshutte, Hanover, Germany

[22] Filed: Oct. 4, 1971

[21] Appl. No.: 186,173

[30] Foreign Application Priority Data

Oct. 8, 1970  Germany....................P 20 49 420.6

[52] U.S. Cl. .........................29/477, 29/480, 29/487, 72/364, 148/11.5, 148/127
[51] Int. Cl. ..............................................B23k 31/02
[58] Field of Search..............................148/11.5, 127; 29/475, 477.7, 487, 477, 480; 72/364

[56] References Cited

UNITED STATES PATENTS

| 3,163,201 | 12/1964 | Schmidt et al.........................72/364 |
| 3,218,693 | 11/1965 | Allen et al. ..........................29/475 X |
| 3,535,484 | 10/1970 | Snow et al. .........................148/127 X |
| 3,590,622 | 7/1971 | Elge et al.........................29/477.7 X |
| 3,648,353 | 3/1972 | Anderson ...........................29/487 X |
| 3,663,311 | 5/1972 | Chen et al. ..........................148/11.5 |

*Primary Examiner*—J. Spencer Overholser
*Assistant Examiner*—Richard Bernard Lazarus
*Attorney*—Marn and Jangarathis

[57] ABSTRACT

Straight-bead welded pipe with an entirely homogeneous gain structure is produced by plastic deformation of the welded pipe, specifically in the area of the weld seam, to substantially destroy the weld-induced variations in grain structure and provide nuclei for new, equiaxed grains. A grain texture is avoided by effecting deformation in two directions with two distinct stresses: bending the pipe away from and back to its axis deforms it in the transverse plane, and compressing the pipe along the weld bead deforms it in the longitudinal plane. Thereafter, the pipe is straightened, annealed and, if desired, reduced to finished diameter and wall thickness.

7 Claims, 4 Drawing Figures

Patented April 24, 1973 3,728,782

INVENTOR
Gerhard Ziemek by

Marn & Janyarathis
ATTORNEYS

PROCESS FOR THE PRODUCTION OF STRAIGHT-BEAD WELDED PIPE

BACKGROUND OF THE INVENTION

The present invention is related to a process for the manufacturing of straight-bead welded pipes, preferably made of nonferrous metal, in which a longitudinally running metal band or strip is shaped into a split tube, the abutting edges are welded by means of an arc welder, and the metal pipe thus formed is subsequently treated further.

More particularly, the present invention is concerned with overcoming certain problems inherently associated with such welded pipes. The welder creates a small zone of fusion in the immediate vicinity of the butted seams, and this is of course the hottest zone. In a pipe (as opposed to welding flat plates, for example) the only direction for the heat induced by welding to travel is through the pipe wall in directions away from the weld. Thus, while the zone of fusion cools, solidifies and forms a fine grain structure, the matrix material adjoining the fusion zone has been subjected to a heat treatment, the intensity of which inversely with distance from the fusion or weld zone. Thus, there may be recrystallization without fusion in an area very close to the fusion zone, but at a greater distance the effect of welding heat will be very significant grain growth. It will be appreciated that such grain growth in a thin or even thick walled pipe, and the non-homogeneous structure of the pipe in section, have very serious effects on the physical and metallurgical properties of the pipe. Physical properties will be anisotropic, and metallurgical properties such as strain aging or resistance to stress corrosion fracture, changing at different rates at different portions of the pipe, can lead to early failure.

One process is known for buttseam welding involving tempering of the welding seam of aluminum or aluminum alloys, wherein the welding seam is remelted, in the absence of additional filler rods, and is then rehardened. As a result, the impurities found in the welding seam should be pushed in the direction of the external layer so that the nature of the junction or joint is changed at the median plane and the joint acquires and improved stability. Some decrease in grain size is at least possible here.

OBJECTS OF THE INVENTION

A general object of the present invention is to provide an improved method of producing straight-bead welded pipe, and apparatus for effecting same.

A further object of the present invention is to provide a method and apparatus for producing straight-bead welded pipe with a homogeneous, equiaxed grain structure.

Another object of the present invention is to provide a method and apparatus for producing straight-bead welded pipe wherein the metallurgical effects of the welding on the pipe material are substantially eliminated.

Various other objects and advantages of the invention will become clear from the following description of embodiments, and the novel features will be particularly pointed out in connection with the appended claims.

THE DRAWINGS

Reference will hereinafter be made to the accompanying drawings, wherein.

DESCRIPTION OF EMBODIMENTS

A straight-bead welded pipe is formed in the conventional manner, i.e. a strip of metal is formed into a tube or pipe by passing same through dies or forming rolls, and a continuous welder closes the seam. Thereafter, the pipe is deformed, in accordance with the invention, by both bending in the transverse plane and compression in the longitudinal plane (both planes being with respect to the pipe axis). By superimposing these two states of stress, the area around the welding seam is cold-worked plastically to a high degree, forming a large number of lattice distortions in the structure. These form nuclei for the new grains that are to be formed. The structure in the area around the welding seam becomes essentially finer in grain upon applying the process according to the invention than was possible by applying previously known processes.

The invention further concerns apparatus for the carrying out of the above process. This device, according to the invention, may comprise a presser roll placed between two blocks which bend the metal pipe away from and back to its continuous axis. The latter presser roll has a bead running around its periphery. With help of this device it is possible to produce a compressive stress by means of the bead running in the peripheral direction in the area around the welding seam. It may be advantageous in some cases to use a die instead of the presser roll, this die causing the metal pipe to be deflected and displaying a projection which presses down on the welding seam. The width of the beading should correspond at least to the width of the welding seam, so that the entire area influenced structurally by the welding heat is under the beading. The entire welding seam region is therefore shaped by the presser roll so that coarsening of the grain is eliminated in the marginal zones of the welding seam.

In order to fully transfer the compressive stress of the presser roll or bead to the welding seam, the presser roll should be appropriately furnished with a counter roll. Presser rolls and/or counter rolls according to the invention have a semicircular recess which runs in a peripheral direction and which is adjusted to the external diameter of the metal pipe, thus preventing lateral sliding of the metal pipe.

Figure 1:
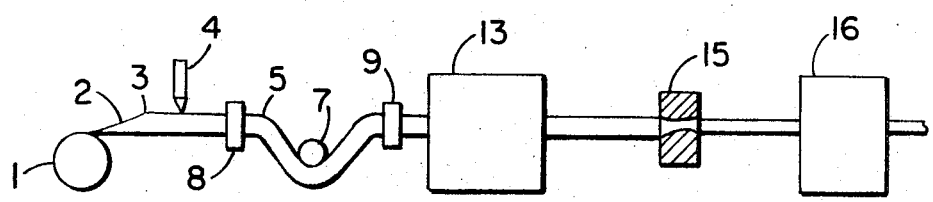
FIG. 1 is a simplified schematic diagram of an embodiment of the invention.
Figure 2:
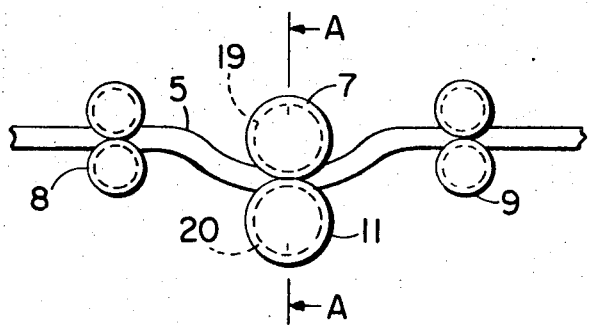
FIG. 2 is a more detailed schematic diagram of pipe deformation apparatus utilized in an embodiment of the invention.
Figure 3:
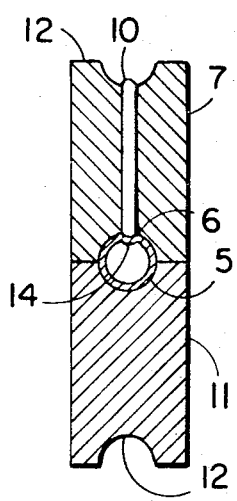
FIG. 3 is a cross-section taken along line A—A of FIG. 2.
Figure 4:
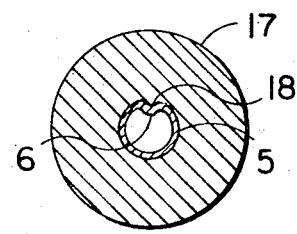
FIG. 4 is a cross-section of a die utilized in a second embodiment of the invention.

With reference to the drawings, metal band 2 is removed from a storage drum 1 and shaped by means of a molding tool (not shown) into a split tube 3, whose band edges are welded by means of an arc welding burner 4, under protective gas. According to the invention, metal pipe 5, for example a copper pipe, is deformed in the area of welding seam 6 through the superimposing of two states of stress, i.e. by bending and compressing it. Bending of the pipe takes place with the help of presser roll 7, which deflects metal pipe 5 from its continuous axis between guide blocks or rolls 8 and 9. Blocks 8 and 9 may also be dies. The second stress state is forced on welding seam 6 through annular beading 10 running in the peripheral direction with respect to presser roll 7. Instead of presser roll 7, it is also possible to use a die 17 (see FIG. 4). This should accordingly display a projection 18 corresponding to beading 10. The width of beading 10 corresponds at least to the width of welding seam 6. In order to make it easier to transfer the compressive stress to welding seam 6 with the aid of beading 10, a counter roll 11 is provided which is, obviously, not necessary when using a die. Presser roll 7 and counter roll 11 have semicircular recesses 19, 20 corresponding to the external diameter of metal pipe 6, which serve for the transport of metal pipe 5. After deformation takes place, metal pipe 5 runs through a continuous annealing furnace 13, which can be heated from outside. However, metal pipe 5 can also be annealed in this furnace between two current-conveying rolls by means of joulean heat.

After annealing, the dent 14 pressed into pipe 5 via beading 10 is pressed out again by means of a mandrel (not shown), which is known in itself. It is also possible to simultaneously reduce the external diameter of metal pipe 5 and reduce wall thickness by means of an extruding device 15. Following this cold-working process, metal pipe 5 is annealed again in another annealing furnace 16, which can be built like annealing furnace 13, so that the welding seam is tempered once again. Lastly, the prepared metal pipe 5 is wound up by well known methods on hoops or drums in a lengthwise direction.

Various changes in the details, materials, steps, and arrangements of parts, which have been herein described and illustrated in order to explain the nature of the invention, may be made by those skilled in the art within the principle and scope of the invention as defined in the appended claims. One example of a variation is to repeat the bending-compression deformation, followed by an additional anneal. It will also be appreciated that the invention is equally adapted for use with discrete lengths of pipe, though it will generally be employed with continuous production equipment.

What Is Claimed Is:

1. Process for the homogenization of straight-beam welded pipe comprising:
   plastically deforming said pipe in the region of said weld by both bending and compression;
   said bending being away from and back to the longitudinal axis of said pipe;
   said compression being carried out by deforming a region including the weld zone inwardly toward the longitudinal axis; and
   annealing said pipe to produce a homogeneous grain structure.

2. The process as claimed in claim 1, wherein said bending is carried out by passing said pipe between guide means coaxial with the axis of said pipe and a roll intermediate said guide means, the periphery of said roll being spaced from the axis of said pipe, said pipe being bent in passing over said roll.

3. The process as claimed in claim 2, and additionally comprising compressing the weld zone of said pipe toward said axis as it passes over said roll.

4. The process as claimed in claim 3, wherein said compression is effected with a peripheral bead on said roll adapted to engage said weld zone, and additionally comprising forcing said pipe against said bead with a counter roll engaging the side of said pipe opposite said weld zone.

5. The process as claimed in claim 1, where said bending and compression are carried out by passing said pipe through a die located intermediate a pair of guide means coaxial with the longitudinal axis of said pipe, the axis of said die being spaced from the axis of said pipe.

6. The process as claimed in claim 5, wherein said compression is provided by a longitudinal bead within said die at least as wide as the weld zone and located so as to compress said weld zone inwardly.

7. In a process for the production of straight-beam welded pipe wherein a strip of metal is formed into a tube with butting edges, said edges are welded and the pipe thus formed is further treated to produce a final product, the improvements comprising subjecting the zone of said welding to plastic deformation by both bending and compression, said bending being away from and back to the longitudinal axis of said pipe; said compression being carried out by deforming a region including the weld zone inwardly toward the longitudinal axis; and annealing the deformed pipe to produce a homogeneous grain structure.

* * * * *